(12) United States Patent
Damm et al.

(10) Patent No.: US 6,457,564 B1
(45) Date of Patent: Oct. 1, 2002

(54) COMBINATION LUBRICATION SYSTEM FOR AN INTERNAL COMBUSTION ENGINE AND ASSOCIATED GEAR DEVICES

(75) Inventors: Klaus-Werner Damm, Chagrin Falls, OH (US); Fredrick P. Boyle, Kirtland, OH (US)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 09/456,174

(22) Filed: Dec. 7, 1999

(51) Int. Cl.$^7$ ................................................. F01M 1/04
(52) U.S. Cl. ....................... 184/6.5; 184/1.5; 184/104.3; 125/196 R
(58) Field of Search ................ 184/6.5–6.9, 6.22, 184/6.24, 104.1–104.3, 1.5; 123/196 A, 196 R, 196 S

(56) References Cited

U.S. PATENT DOCUMENTS

| | | | |
|---|---|---|---|
| 2,107,188 A | * 2/1938 | Ryder et al. | 184/104.1 |
| 2,150,150 A | 3/1939 | Burrors et al. | 105/62 |
| 2,311,069 A | * 2/1943 | Miller | 184/104.1 |
| 2,979,160 A | 4/1961 | Haas | 184/6 |
| 3,286,791 A | * 11/1966 | Cofer et al. | 184/104.1 |
| 3,451,214 A | * 6/1969 | Bradley | 184/6.22 |
| 4,102,316 A | * 7/1978 | Valbert | 123/196 S |
| 4,498,525 A | * 2/1985 | Smith | 184/6.22 |
| 4,503,679 A | * 3/1985 | Saito et al. | 184/6.22 |
| 4,622,817 A | * 11/1986 | Kobayashi | 184/6.22 |
| 4,665,319 A | 5/1987 | Seepe et al. | 290/3 |
| 4,969,332 A | * 11/1990 | Nancarrow et al. | 60/608 |
| 5,034,638 A | * 7/1991 | McCabria | 310/54 |
| 5,078,871 A | 1/1992 | McCready | 210/222 |
| 5,101,936 A | * 4/1992 | Paredes et al. | 184/6.13 |
| 5,217,085 A | * 6/1993 | Barrie et al. | 184/104.1 |
| 5,318,152 A | 6/1994 | Ehlert | 184/6.26 |
| 5,320,196 A | * 6/1994 | Mouton | 184/104.1 |
| 5,353,760 A | 10/1994 | Zager | 123/196 S |
| 5,517,959 A | * 5/1996 | Kato et al. | 184/104.1 |
| 5,720,249 A | 2/1998 | Betts et al. | 123/196 S |
| 5,964,318 A | * 10/1999 | Boyle et al. | 184/1.5 |
| 6,021,868 A | * 2/2000 | Bogema | 184/6.22 |

FOREIGN PATENT DOCUMENTS

| | | | |
|---|---|---|---|
| EP | 793 005 A1 | 9/1997 | 11/4 |
| EP | 928 883 A1 | 7/1999 | 11/4 |

* cited by examiner

*Primary Examiner*—Chong H. Kim
(74) *Attorney, Agent, or Firm*—Teresan W. Gilbert; Michael F. Esposito

(57) ABSTRACT

A lubrication system for supplying a portion of the engine lubricant to one or more gear devices driven thereby and return to the engine independent of whether the gear devices are being driven at the time. Thus even when the engine is idling engine lubricant is circulated through the gear devices to maintain the temperature of the lubricant circulating through the gear devices within a relatively narrow temperature range. Also, the lubricant level within the gear devices will be maintained without the need for inspection of the gear devices as long as the engine lubricant level is regularly checked and maintained either manually or automatically. Further, by changing the engine lubricant at regular service intervals or using an automated lubricant change system, the quality and level of the lubricant in the gear devices is also maintained.

8 Claims, 3 Drawing Sheets

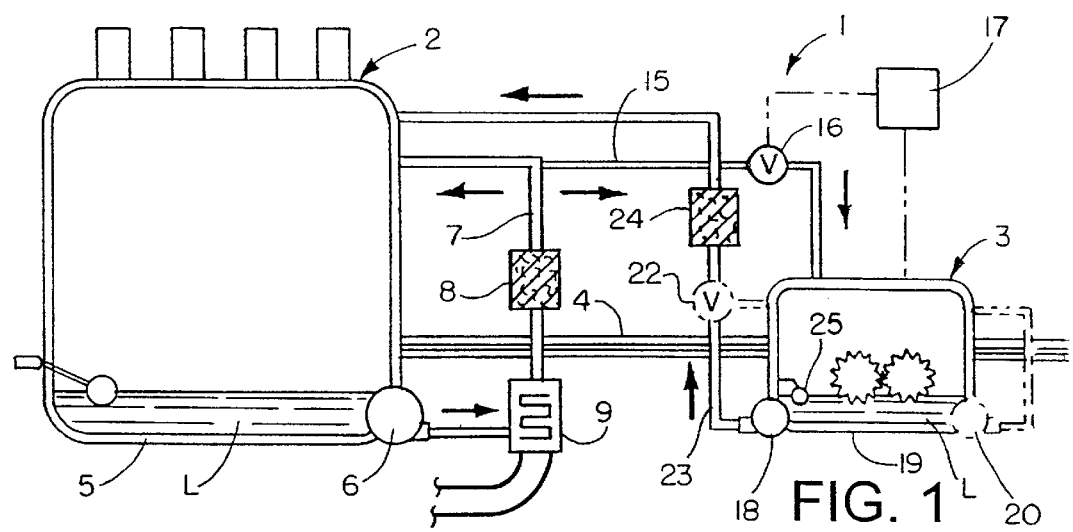
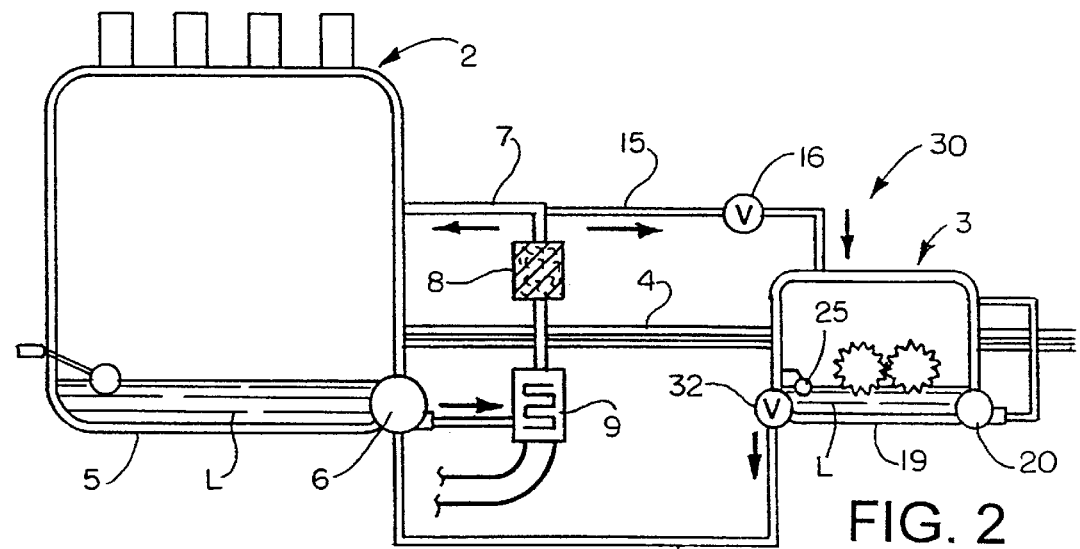
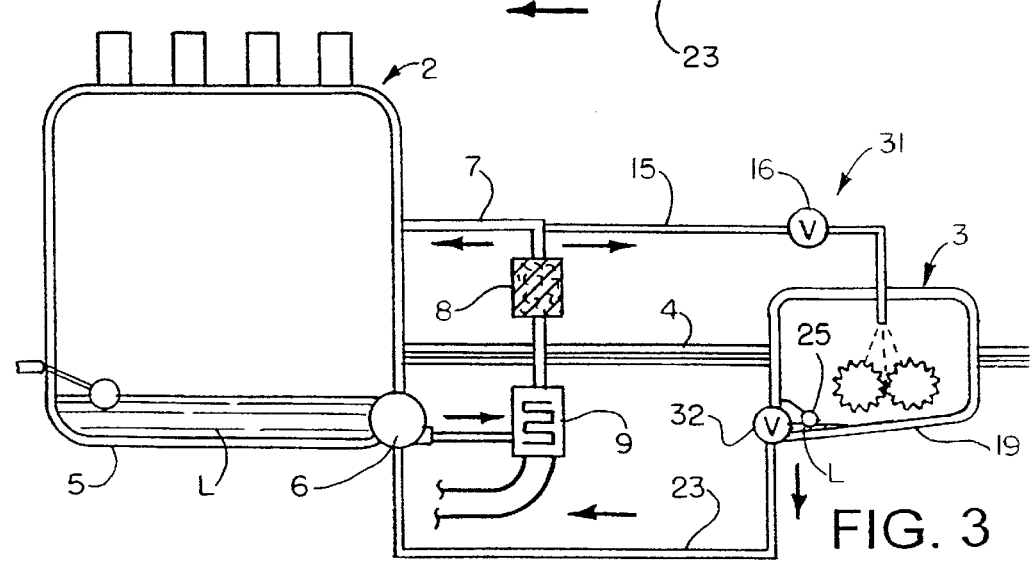

COMBINATION LUBRICATION SYSTEM FOR AN INTERNAL COMBUSTION ENGINE AND ASSOCIATED GEAR DEVICES

FIELD OF THE INVENTION

This invention relates to a lubrication system for an internal combustion engine that also provides a ready source of supply of lubricant to one or more associated gear devices.

BACKGROUND OF THE INVENTION

Internal combustion engines can be used to drive gear devices either directly or indirectly. Examples of directly driven gear devices as used herein are transmissions or differentials used to convert rotary motion of the engine output to rotary motion of a drive wheel. Examples of indirectly driven gear devices as used herein are locomotive traction motor gear boxes for motorized wheel assemblies. For these gear devices, an internal combustion engine drives an electric generator that produces electricity used to power an electric motor that turns the gears to drive the wheels.

Currently the lubrication systems for such gear devices are independent of the engine lubrication system and are generally self-contained. One problem with these types of lubrication systems is that the temperature of the gear lubricant is not easily maintained within a desired temperature range. In contrast, the temperature of the lubricant in an internal combustion engine including particularly a large internal combustion engine is relatively well controlled either by the engine coolant system or by a separate coolant system.

It would be desirable to control the temperature of the gear device lubricant as well as the engine lubricant, since most lubricants are typically optimized to provide maximum performance in a particular temperature range. For example, if the lubricant temperature is too high, the lubricant (which is comprised of a base lubricant and additives), begins to degrade or the lubricant viscosity becomes too low to provide optimum protection. If the lubricant temperature is too low, the lubricant additives may not be "activated", or lubricant viscosity may be too high to properly flow to the gear device surfaces requiring lubrication.

Some gear devices use ambient air coolers to limit maximum lubricant temperature whereas others use the engine coolant system to limit both the high and low temperatures of the gear device lubricant by either pumping the lubricant from the gear devices through a line that runs through the engine coolant, or by pumping the engine coolant through a line that runs through or adjacent to the gear devices. A major drawback to this type of lubricant temperature control is that if a coolant leak were to occur into the gear device lubricant, it could lead to catastrophic failure.

Another problem with current gear device lubrication systems is that gear device lubricant leaks are not uncommon and are usually difficult to detect and/or check due to their location. Because the lubricant sumps for gear devices are small in relation to the size of an engine lubricant sump, a gear device lubricant leak can quickly deplete the lubricant in the gear devices, leading to catastrophic failure of the gear devices.

Still another problem with current gear device lubrication systems is that current trends in the industry are to extend gear device lubricant changes as long as possible, generally much longer than the engine lubricant change interval, whereby the removal of either normal or abnormal wear debris from the gear device lubricant may not be frequent enough to maximize the life of the gear devices.

SUMMARY OF THE INVENTION

The present invention relates to a lubrication system that overcomes the problem of controlling the temperature of the gear device lubricant by circulating a single lubricant (that is formulated to lubricate both the internal combustion engine and the gear devices driven either directly or indirectly by the engine) between the engine and the gear devices driven thereby.

Because of lubricant chemistry, such a lubrication system may be most appropriate where the engine is a heavy-duty diesel engine. However, it will be appreciated that such a lubrication system can also be utilized with non-diesel internal combustion engines if desired. Moreover, the lubricant can be formulated for typical engine lubricant change intervals, or for an automated system for maintaining the quality and level of lubricant in the system by periodically removing a portion of the used lubricant for either consumption along with the fuel or later reprocessing and adding fresh lubricant to maintain the lubricant level in the engine in the manner disclosed, for example, in U.S. Pat. No. 5,964,318 assigned to the same assignee as the present invention, the entire disclosure of which is incorporated herein by reference.

Such a lubrication system also overcomes the problem of minor gear device lubricant leaks since the engine lubricant sump is of sufficient size and is monitored on a sufficiently regular basis to minimize the risk of catastrophic failure of either the gear device or engine due to lubricant leaks. Further, the engine lubricant filtration device provides for removal of the gear device wear debris. Moreover, with the more regular engine lubricant change interval, complete removal of wear debris will occur more often.

In accordance with one aspect of the invention, the lubrication system circulates a portion of the lubricant that is circulated through the engine to one or more gear devices driven thereby and returns any excess gear device lubricant to the engine.

In accordance with another aspect of the invention, the lubricant pump that is used to circulate the lubricant through the engine also supplies a portion of the engine lubricant to the gear device(s).

In accordance with another aspect of the invention, a valve regulates the flow of pressurized lubricant from the engine to the gear device(s).

In accordance with another aspect of the invention, a single heat exchanger maintains the temperature of the lubricant passing through the engine and through the gear device(s) within a predetermined temperature range.

In accordance with another aspect of the invention, the filter that is used to filter the lubricant being circulated through the engine also filters the lubricant being circulated through the gear device(s).

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various way in which the principles of the invention may be employed.

BRIEF DESCRIPTION OF THE DRAWINGS

In the annexed drawings:

FIG. 1 is a schematic illustration of one form of lubrication system in accordance with the invention for lubricating both an internal combustion engine and one or more gear devices driven thereby;

FIGS. 2 through 4 are schematic illustrations of other forms of such lubrication systems.

DETAILED DESCRIPTION OF THE INVENTION

Figure 4:
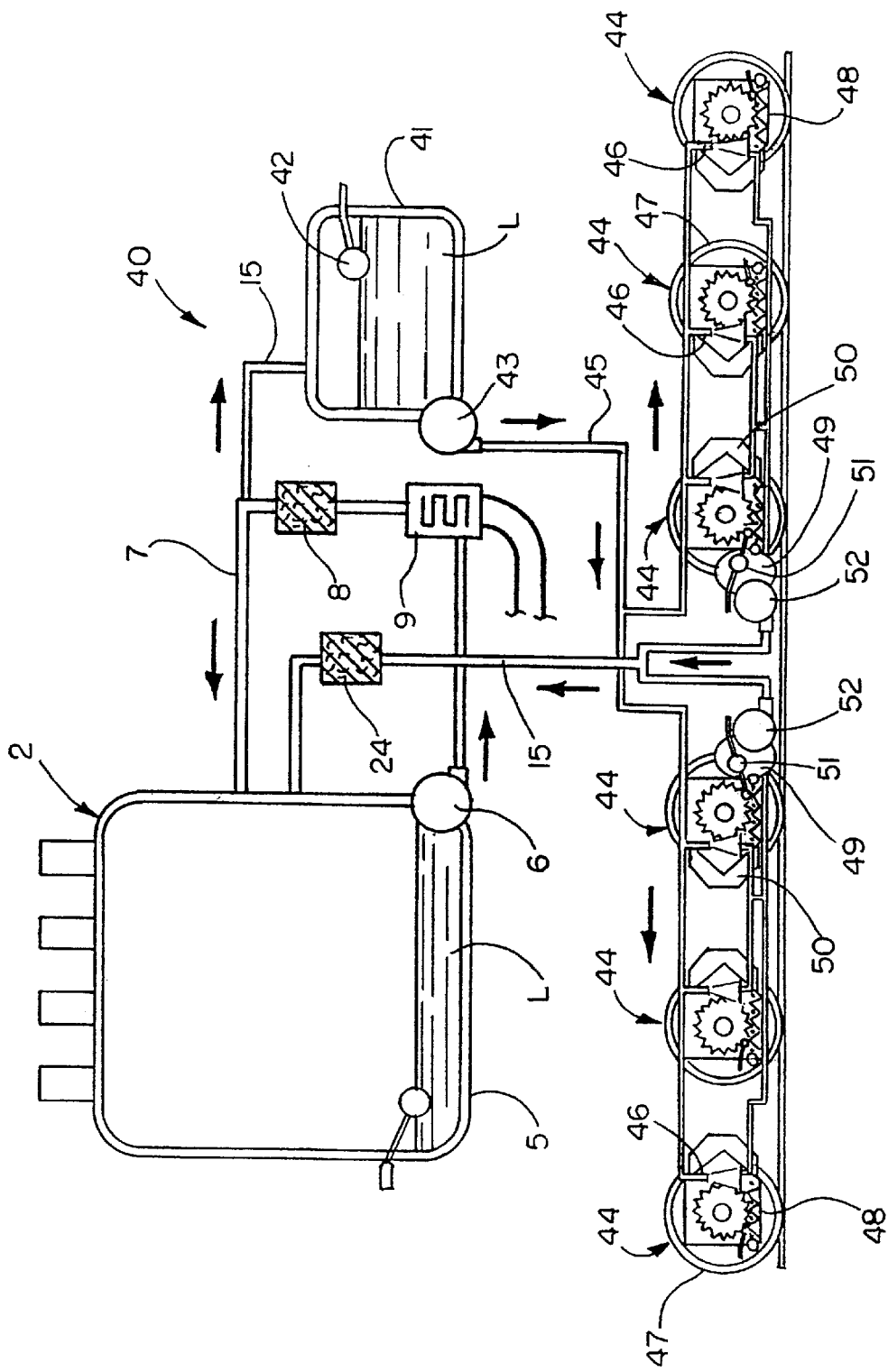

Referring now in detail to the drawings, and initially to FIG. 1, there is schematically shown one form of lubrication system 1 in accordance with the invention for circulating lubricant L between an internal combustion engine 2 and a gear device 3 driven either directly or indirectly by the engine drive shaft 4 during engine operation independent of whether the gear device is being driven at the time as described hereafter. The engine 2 includes the usual engine lubricant sump 5 containing an adequate supply of the lubricant L which is formulated to lubricate both the internal combustion engine and one or more gear devices driven thereby. During engine operation, a lubricant pump 6 driven by the engine 2 causes the lubricant L to flow from the engine lubricant sump 5 through an external lubricant line 7 containing a suitable filter 8 and, if desired, a lubricant temperature control device/heat exchanger 9, and onto the moving parts of the engine to minimize friction and wear. The engine lubricant then returns to the sump for recirculation through the fluid line and onto the moving engine parts as before.

Connected to the high pressure engine lubricant line 7 downstream of the filter 8 and temperature control device/heat exchanger 9 (if equipped) is a fluid conduit 15 for supplying a portion of the high pressure lubricant to the gear device 3. The amount of lubricant passing through the fluid conduit 15 to the gear device 3 can be controlled passively by a valve or orifice 16 or actively by a feedback system 17 designed to control pressure and/or volume.

Lubrication of the gear device 3 can either be by "splash" lubrication or by circulating the lubricant collected by the gear device lubricant sump 19 onto the friction and wear surfaces of the gear device using the same pump 18 used to return excess lubricant from the gear device lubricant sump 19 to the engine or another pump 20. If the pump 18 is used for this purpose, a valve 22 may be provided in the lubricant return line 23 from the gear device lubricant sump 19 to the engine 2 for controlled flow of a portion of the lubricant passing through the lubricant return line onto the moving parts of the gear device and back to the gear device sump. A level sensor 25 may also be provided in the gear device lubricant sump 19 for activating the pump 18 to pump excess lubricant from the gear device lubricant sump through the lubricant return line 23 back to the engine 2 when the lubricant level in the gear device lubricant sump exceeds a predetermined amount. Within the return line 23 is a filter 24 for filtering the lubricant before reentering the engine 2.

FIGS. 2 and 3 show other lubrication systems 30 and 31 in accordance with the invention which are similar to the lubrication system 1 shown in FIG. 1 and accordingly the same reference numerals are used to designate like parts. In the FIG. 2 embodiment, as in the FIG. 1 embodiment, a controlled amount of lubricant L is taken from the engine high pressure lubricant line 7 and supplied to the gear device 3 through the fluid conduit 15 for use in lubricating the gear device either by splash lubrication or by a pump 20 in the gear device as described above. However, in the FIG. 2 embodiment, the lubricant return line 23 from the gear device sump 19 is connected to the inlet of the engine lubricant pump 6. A valve 32 in the lubricant return line 23 is controlled by the lubricant level sensor 24 within the gear device sump 19 to allow excess lubricant L to be removed from the gear device sump by the engine lubricant pump 6. This eliminates the need for a separate pump to pump the excess lubricant from the gear device sump 19 to the engine. Also, the lubricant from the gear device sump 19 is filtered by the engine lubricant filter 8 before reentering the engine, thus eliminating the need for an additional filter in the gear device lubricant return line 23.

The lubrication system 31 shown in FIG. 3 also takes a controlled amount of lubricant L from the engine high pressure lubricant line 7 and supplies the lubricant to the gear device 3 through the fluid conduit 15. In this embodiment, the lubricant L entering the gear device 3 is shown being sprayed directly onto the friction and wear surfaces of the gear device using the pressure from the engine lubricant pump 6. Also, the lubricant return line 23 with valve 32 is shown connecting the gear device sump 19 to the inlet of the engine lubricant pump 6 for use in removing excess lubricant from the gear device sump as in the FIG. 2 embodiment. However, the gear device sump 19 shown in FIG. 3 need not contain a significant amount of lubricant since the lubricant passes through the gear device only once before being returned to the engine. Thus the gear device lubricant sump 19 can be essentially a dry sump. However, that has the limitation that should the gear device 3 of the FIG. 3 embodiment be driven without the engine 2 running (for example when a vehicle is being towed without the engine running and the gear device is still engaged), the gear device, while not under high load, may not be adequately lubricated.

FIG. 4 shows another form of lubrication system 40 in accordance with this invention which is similar to the lubrication systems previously described and accordingly the same reference numerals are used to designate like parts. However, in this embodiment the lubricant L that is taken from the engine high pressure lubricant line 7 for lubricating the gear devices is first supplied to an equalizing reservoir 41. Within the reservoir 41 is a level sensor 42 and positive displacement pump 43 for controlling the flow of the lubricant from the reservoir 41 to the gear devices 44 which may, for example, comprise traction motor gear assemblies of four or six axle locomotives utilizing either DC or AC traction driven by a heavy duty diesel engine 2. The fluid conduit 45 from the reservoir 41 to the gear devices 44 communicates with spray nozzle type inlets 46 in the motor gear cases 47 to provide lubricant to the moving surfaces of the gears. Also, baffled overflow tubes 48 may be provided for collecting excess lubricant within the motor gear cases 47 and guiding the excess lubricant to collection reservoirs 49 mounted low on the truck frames 50 of the locomotive. Within the collection reservoirs 49 are lubricant level sensors 51 and positive displacement pumps 52 for returning the excess lubricant through the lubricant return line 15 back to the diesel engine. A magnetic particle collector or other suitable type filter 24 is provided in the lubricant return line 15 to prevent introduction of debris into the diesel engine 2.

Figure 5:
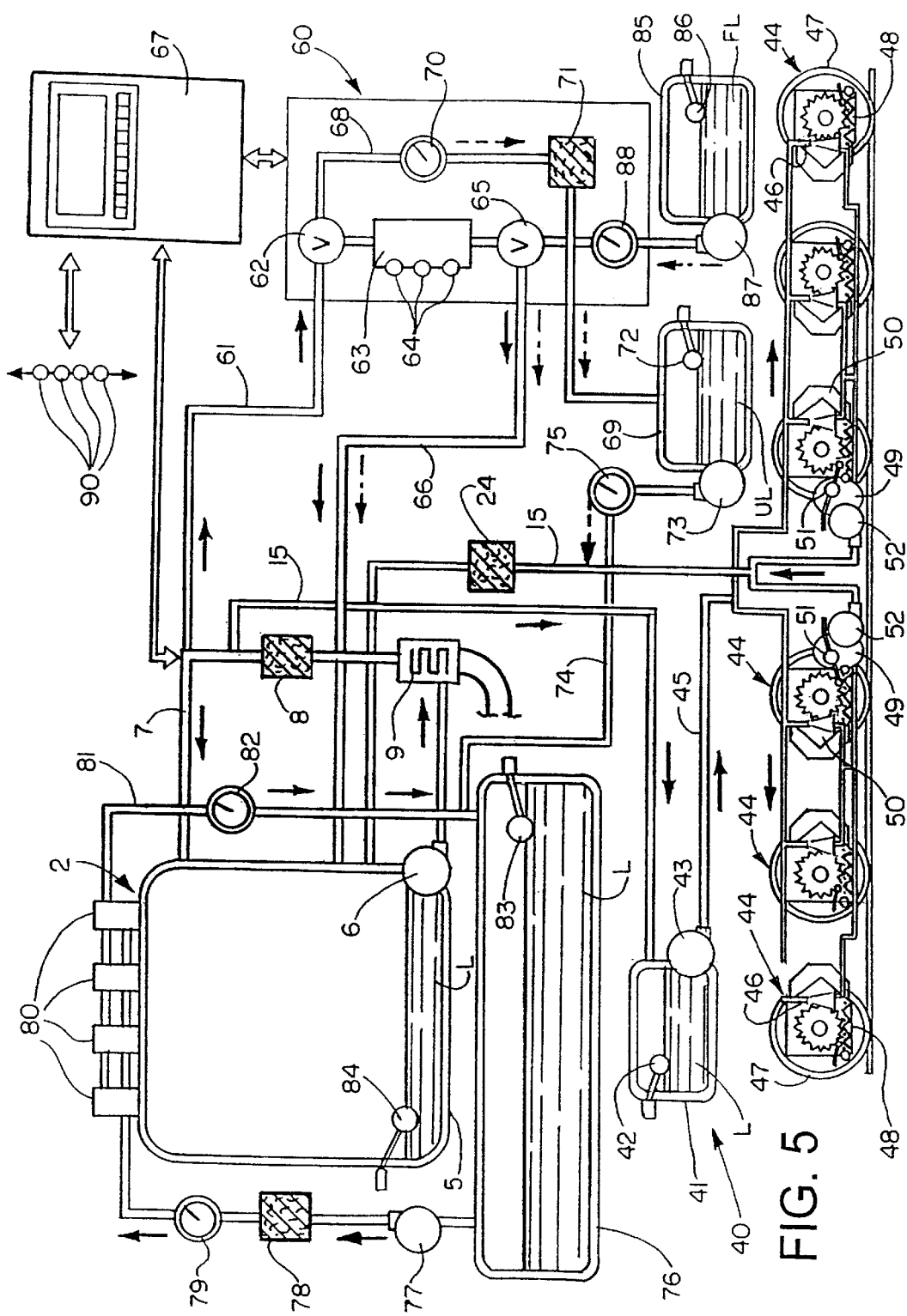
FIG. 5 is a schematic illustration of the lubrication system of FIG. 4 that also incorporates an automatic lubricant change system.

FIG. 5 shows the lubrication system 40 of FIG. 4 incorporating an automatic lubricant change system 60 of the type disclosed for example in U.S. Pat. No. 5,964,318 assigned to the same assignee as the present invention, the entire disclosure of which is incorporated herein by reference. Such lubrication system 40 includes, in addition to the fluid line 15 for supplying lubricant L from the engine high pressure lubricant line 7 to the equalizer reservoir 41, a further fluid conduit 61 connected to the engine high pressure lubricant line 7 downstream of the engine lubricant filter 8. This further fluid conduit 61 is sized to permit a relatively small amount, for example approximately three percent of the total flow output of the engine lubricant pump 6, to pass through this further conduit 61. Within this further conduit 61 is a valve 62 which, in the normal "off" state, directs the portion of the pressurized lubricant passing through conduit 61 through a diagnostic cell 63 containing a plurality of sensors 64 for diagnosing certain qualities or characteristics of the lubricant, for example, the temperature, pressure, dielectric and/or viscosity of the lubricant. Downstream of the diagnostic cell 63 is another valve 65 which, in the normal "off" state, returns the portion of the lubricant passing through the diagnostic cell 63 through another return line 66 to the engine 2.

A system controller 67 monitors the outputs from the sensors 64 in the diagnostic cell 63 (and possibly others) to determine lubricant quality based on a control algorithm. When the quality of the lubricant drops below a predetermined level as determined by the controller, the controller periodically commands the valve 62 to redirect the lubricant passing through the conduit 61 to another conduit 68 upstream of the diagnostic cell 63 in communication with a used lubricant reservoir 69 for storage of the used lubricant UL entering the reservoir until otherwise disposed of. A meter 70 and filter 71 may be provided in the conduit 68 upstream of the used lubricant reservoir 69 for metering and filtering the used lubricant before entering the reservoir. Within the reservoir 69 is a lubricant level sensor 72 for roughly determining the volume of used lubricant in the reservoir.

If the engine 2 is of a type such as a diesel engine that can burn a lubricant-fuel mixture, a pump 73 may be provided within the used lubricant reservoir 69 for pumping a predetermined amount of the used lubricant UL within the reservoir through a conduit 74 containing a flow meter 75 and into the engine fuel tank 76 upon command by the system controller 67 as also schematically shown in FIG. 5.

The lubricant-fuel mixture is pumped from the fuel tank 76 by a fuel pump 77 through a fuel filter 78 and meter 79 to the fuel injectors 80 of the engine 2 during engine operation. Depending on the throttle position of the engine, each injector 80 injects metered amounts of fuel into the engine at very high pressures. The excess fuel serves to cool the injectors and is returned to the fuel tank through a common line 81 containing a fuel meter 82. Level sensors 83 and 84 in both the fuel tank 76 and engine sump 5 roughly determine the liquid volume in each of these reservoirs.

Preferably the used lubricant UL that is added to the fuel tank 76 is either done so in conjunction with the fueling of the fuel tank or as soon after refueling as possible to maximize the amount of used lubricant that can be added to the fuel without exceeding a predetermined lubricant/fuel ratio for the engine. Also the used lubricant is desirably added to the fuel tank 76 through the common line 81 only while the engine 2 is operating so that the used lubricant added to the fuel will be mixed with the warm, relatively rapidly flowing fuel returning from the injectors 80 to the fuel tank.

The automatic oil change system 60 shown in FIG. 5 also includes a reservoir 85 containing fresh lubricant FL for use in maintaining the desired quality and level of lubricant within the engine lubricant sump 5. A lubricant level sensor 86 is provided in the reservoir 85 for roughly determining the volume of fresh lubricant within the reservoir. The fresh lubricant reservoir is desirably selectively connected to the same fluid return conduit 66 through which the diverted lubricant from the engine is normally recirculated back to the engine by the three-way valve 65 in the conduit 61 downstream of the diagnostic cell 63. When commanded by the system controller 67, valve 65 moves to a position blocking flow of lubricant through the diagnostic cell 63 and allowing fresh lubricant to be pumped from the fresh lubricant reservoir 85 by a pump 87 within the reservoir through a meter 88 into the conduit 66 downstream of the diagnostic cell 63 and into the engine as schematically shown in FIG. 5.

In operation, the system controller 67 monitors the sensors 64 in the diagnostic cell 63, the level sensors 72 and 86 in the used and fresh lubricant reservoirs 69 and 85, the flow meter 70 for measuring the rediverted flow of used lubricant to the used lubricant reservoir 69, and the flow meters 75 and 88 for measuring the outflows from the used and fresh lubricant reservoirs 69 and 85. Also the system controller 67 may be used to monitor other components such as the lubricant level sensor 84 in the engine lubricant sump 5, the fuel level sensor 83 and possibly the fuel meters 79 and 82 as well as other sensors 90 mounted in conjunction with or on the engine for measuring such engine parameters as engine usage based on one or more operating variables of the engine or of the equipment powered by the engine including the number of engine starts, engine running time, number of miles driven, amount of fuel used since the last fresh lubricant addition, etc.

Based on the monitored sensors and/or components, the system controller 67 determines when to activate the valve 62 to redirect a portion of the engine lubricant to the used lubricant reservoir 69 (or directly to the engine fuel tank 76 if no used lubricant reservoir is provided), and when to activate the valve 65 and pump 87 in the fresh lubricant reservoir 85 to transfer fresh lubricant to the engine to maintain the quality and level of the lubricant in the engine. Also based on monitored sensors and/or components, the system controller 67 determines the amount of fuel added to the engine fuel tank 76 and activates the pump 73 (if the used lubricant reservoir 69 is included in the system) to pump used lubricant from the used lubricant reservoir 69 to the fuel tank in an amount not to exceed a predetermined lubricant/fuel ratio, or until the used lubricant reservoir 69 is empty.

Also based on monitored sensors and/or components, the system controller 67 determines when to activate the valve 65 for blocking the flow of diverted lubricant from the engine through the diagnostic cell 63 and the pump 87 in the fresh lubricant reservoir 85 to transfer fresh lubricant into the engine.

From the foregoing, it will be appreciated that during engine operation, engine lubricant is circulated between the engine and one or more gear devices, independent of whether the gear devices are being driven at the time. Thus, even when the engine is idling, engine lubricant is circulated through the gear devices to maintain the temperature of the lubricant circulating through the gear devices within a relatively narrow temperature range. Also, the lubricant level within the gear devices will be maintained without the need for inspection of the gear devices as long as the engine lubricant level is regularly checked and maintained either manually or automatically. Further, by changing the engine lubricant at regular service intervals or using an automated lubricant oil change system for example of the type previously described, not only is the quality and level of the lubricant in the engine maintained, but also in the gear devices.

Although the invention has been shown and described with respect to certain embodiments, it is obvious that equivalent alterations and modifications will occur to others skilled in the art upon the reading and understanding of the specification. In particular with regard to the various functions performed by the above described components, the terms used to describe such components (including any reference to a "means") are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A lubrication system for lubricating an internal combustion engine and a gear device driven thereby comprising an engine lubricant sump containing:
   (a) lubricant,
   (b) a first flow path for circulating lubricant from said engine sump through said engine and return to said engine sump,
   (c) a second flow path for supplying lubricant from said engine sump to said gear device,
   (d) a third flow path for returning lubricant from said gear device to said engine, wherein said third flow path is in fluid communication with an inlet to an engine driven pump whereby said engine driven pump pumps lubricant from said gear device to said engine through said first flow path,
   (e) a lubricant filter in said first flow path, said second flow path communicating with said first flow path downstream of said filter whereby said filter filters the lubricant passing through both said first flow path and said second flow path, and
   (f) a heat exchanger in said first flow path for maintaining the temperature of the lubricant passing through said first flow path within a predetermined temperature range, said second flow path communicating with said first flow path downstream of said heat exchanger whereby said heat exchanger also maintains the temperature of the lubricant passing through said second flow path within a predetermined temperature range.

2. The lubrication system of claim 1 further comprising said engine driven pump for pumping lubricant from said engine sump through said first flow path and said second flow path.

3. The lubrication system of claim 2 wherein said second flow path is in fluid communication with said first flow path downstream of said engine driven pump.

4. The lubrication system of claim 2 further comprising a valve in said third flow path for regulating the flow of lubricant through said third flow path.

5. The lubrication system of claim 4 wherein said gear device includes a gear device sump for collecting lubricant entering said gear device through said second flow path, and a lubricant level sensor in said gear device sump for opening said valve to permit lubricant flow through said third flow path when the lubricant in said gear device sump exceeds a predetermined level.

6. A lubrication system for lubricating an internal combustion engine and a gear device driven by comprising an engine lubricant sump containing:
   (a) lubricant,
   (b) a first flow path for circulating lubricant through said engine and return to said engine sump,
   (c) an engine-driven pump for pumping lubricant from said engine sump through said first flow path to said engine,
   (d) a second flow path communicating with said first flow path downstream of said engine-driven pump for diverting a portion of the pressurized lubricant passing through said first flow path to said gear device,
   (e) a third flow path for returning lubricant from said gear device to said engine, wherein said third flow path is in fluid communication with an inlet to said engine driven pump whereby said engine driven pump pumps lubricant from said gear device to said engine through said first flow path,
   (f) a lubricant filter in said first flow path, said second flow path communicating with said first flow path downstream of said filter whereby said filter filters the lubricant passing through both said first flow path and said second flow path, and
   (g) a heat exchanger in said first flow path for maintaining the temperature of the lubricant passing through said first flow path within a predetermined temperature range, said second flow path communicating with said first flow path downstream of said heat exchanger whereby said heat exchanger also maintains the temperature of the lubricant passing through said second flow path within a predetermined temperature range.

7. The lubrication system of claim 6 further comprising a heat exchanger in said first flow path upstream of said second flow path for maintaining the temperature of the lubricant passing through said first flow path and said second flow path within a predetermined temperature range.

8. The lubrication system of claim 6 further comprising a filter in said first flow path upstream of said second flow path for filtering the lubricant passing through said first flow path and said second flow path.

* * * * *